United States Patent
Nicoleau et al.

(10) Patent No.: US 9,388,077 B2
(45) Date of Patent: Jul. 12, 2016

(54) HARDENING ACCELERATOR COMPOSITION

(71) Applicant: Construction Research & Technology, GmbH, Trostberg (DE)

(72) Inventors: Luc Nicoleau, Altenmarkt (DE); Torben Gädt, Traunstein (DE); Harald Grassl, Feichten (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 14/420,465

(22) PCT Filed: Aug. 12, 2013

(86) PCT No.: PCT/EP2013/066776
§ 371 (c)(1),
(2) Date: Feb. 9, 2015

(87) PCT Pub. No.: WO2014/026938
PCT Pub. Date: Feb. 20, 2014

(65) Prior Publication Data
US 2015/0291474 A1    Oct. 15, 2015

(30) Foreign Application Priority Data

Aug. 13, 2012 (EP) .................................... 12180201

(51) Int. Cl.
| | | |
|---|---|---|
| *C08K 3/00* | (2006.01) | |
| *C04B 22/00* | (2006.01) | |
| *C04B 40/00* | (2006.01) | |
| *C04B 24/26* | (2006.01) | |
| *C04B 103/14* | (2006.01) | |

(52) U.S. Cl.
CPC ............. *C04B 22/00* (2013.01); *C04B 22/0086* (2013.01); *C04B 24/2641* (2013.01); *C04B 40/0039* (2013.01); *C04B 2103/14* (2013.01)

(58) Field of Classification Search
CPC ........................... C04B 22/00; C04B 24/2641
USPC ............................................................ 524/3
See application file for complete search history.

(56) References Cited

U.S. PATENT DOCUMENTS

| | | | |
|---|---|---|---|
| 3,686,133 A | 8/1972 | Hattori et al. | |
| 4,725,665 A | 2/1988 | Pieh et al. | |
| 5,332,041 A | 7/1994 | Onan et al. | |
| 5,355,954 A | 10/1994 | Onan et al. | |
| 5,360,841 A | 11/1994 | Knop et al. | |
| 5,413,634 A | 5/1995 | Shawl et al. | |
| 5,609,680 A | 3/1997 | Kobayashi et al. | |
| 5,709,743 A | 1/1998 | Leture et al. | |
| 5,750,634 A | 5/1998 | Albrecht et al. | |
| 5,879,445 A | 3/1999 | Guicquero et al. | |
| 5,925,184 A | 7/1999 | Hirata et al. | |
| 6,133,347 A | 10/2000 | Vickers, Jr. et al. | |
| 6,170,574 B1 | 1/2001 | Jones | |
| 6,451,881 B1 | 9/2002 | Vickers, Jr. et al. | |
| 6,492,461 B1 | 12/2002 | Vickers, Jr. et al. | |
| 6,832,652 B1 | 12/2004 | Dillenbeck et al. | |
| 6,855,752 B2 | 2/2005 | Velten et al. | |
| 6,861,459 B2 | 3/2005 | Porsch et al. | |
| 6,908,955 B2 | 6/2005 | Porsch et al. | |
| 7,041,167 B2 | 5/2006 | Jiang | |
| 7,258,736 B2 | 8/2007 | Oriakhi et al. | |
| 7,605,196 B2 | 10/2009 | Schinabeck et al. | |
| 7,641,731 B2 | 1/2010 | Chanut et al. | |
| 7,772,300 B2 | 8/2010 | Schinabeck et al. | |
| 8,343,271 B1 | 1/2013 | Lu et al. | |
| 8,349,960 B2 | 1/2013 | Gaeberlein et al. | |
| 8,436,072 B2 | 5/2013 | Herth et al. | |
| 2002/0129743 A1 | 9/2002 | Frailey et al. | |
| 2003/0181579 A1 | 9/2003 | Porsch et al. | |
| 2004/0261664 A1 | 12/2004 | Oriakhi et al. | |
| 2006/0213395 A1 | 9/2006 | Lu et al. | |
| 2007/0032550 A1 | 2/2007 | Lewis et al. | |
| 2007/0163470 A1 | 7/2007 | Chanut et al. | |
| 2008/0108732 A1 | 5/2008 | Wieland et al. | |
| 2008/0190614 A1 | 8/2008 | Ballard | |
| 2008/0200590 A1 | 8/2008 | Schinabeck et al. | |
| 2008/0319217 A1 | 12/2008 | Ingrisch et al. | |

(Continued)

FOREIGN PATENT DOCUMENTS

| | | |
|---|---|---|
| CA | 2071051 A1 | 12/1992 |
| DE | 35 27 981 A1 | 2/1987 |

(Continued)

OTHER PUBLICATIONS

PCT/EP2013/066776—International Search Report, Dec. 3, 2013.
PCT/EP2013/066776—International Written Opinion, Dec. 3, 2013.
PCT/EP2013/066776—International Preliminary Report on Patentability, Feb. 17, 2015.
Cölfen, Helmut; "Analytical Ultracentrifugation of Nanoparticles"; Polymer News; 2004; vol. 29; p. 101-116; Taylor & Francis; Abstract.
Saito, Fumio, et al.; "Mechanochemical Synthesis of Hydrated Calcium Silicates by Room Temperature Grinding"; Solid State Ionics; 1997; pp. 37-43; Elsevier.
"Silica"; Ullmann's Encyclopedia of Industrial Chemistry; 2002; Wiley-VCH Verlag GmbH & Co. KGaA; Abstract.
Benard, et al. "Hydration process and rheological properties of cement pastes modified by orthophosphate addition"; Journal of the European Ceramic Society; Jul. 1, 2005; vol. 25; No. 11; pp. 1877-1883; Elsevier Science Publishers, Barking, Essex, Great Britain.

*Primary Examiner* — Hui Chin
(74) *Attorney, Agent, or Firm* — Curatolo Sidoti Co., LPA; Joseph G. Curatolo; Salvatore A. Sidoti

(57) ABSTRACT

The invention concerns a process for the preparation of a hardening accelerator composition by reaction of a water-soluble calcium compound with a water-soluble silicate compound, said reaction being carried out in the presence of an aqueous solution which contains a water-soluble comb polymer suitable as a plasticizer for hydraulic binders, wherein the water-soluble comb polymer is present as a copolymer which is produced by free radical polymerization in the presence of a phosphorylated monomer and a (meth)acrylic acid ester based polyether macromonomer.

25 Claims, 1 Drawing Sheet

(56) References Cited

U.S. PATENT DOCUMENTS

| | | |
|---|---|---|
| 2009/0054558 A1 | 2/2009 | Wieland et al. |
| 2009/0186964 A1 | 7/2009 | Schinabeck et al. |
| 2009/0229492 A1 | 9/2009 | Mills |
| 2010/0190888 A1 | 7/2010 | Gaeberlein et al. |
| 2011/0015301 A1 | 1/2011 | Herth et al. |
| 2011/0095227 A1 | 4/2011 | Herth et al. |
| 2011/0160393 A1 | 6/2011 | Sakamoto et al. |
| 2011/0269875 A1* | 11/2011 | Nicoleau ............... C04B 28/02 524/2 |
| 2012/0196046 A1 | 8/2012 | Nicoleau et al. |
| 2012/0216724 A1 | 8/2012 | Nicoleau et al. |
| 2012/0220696 A1 | 8/2012 | Nicoleau et al. |
| 2012/0270969 A1 | 10/2012 | Bichler et al. |
| 2012/0270970 A1 | 10/2012 | Bichler et al. |
| 2013/0035423 A1 | 2/2013 | Sabio et al. |
| 2013/0118381 A1 | 5/2013 | Frenkenberger et al. |
| 2014/0066546 A1 | 3/2014 | Langlotz et al. |

FOREIGN PATENT DOCUMENTS

| | | |
|---|---|---|
| DE | 43 42 407 A1 | 6/1995 |
| DE | 44 11 797 A1 | 10/1995 |
| DE | 197 24 700 A1 | 12/1998 |
| DE | 103 51 259 A1 | 6/2005 |
| DE | 10 2005 001 101 A1 | 7/2006 |
| DE | 20 2006 016 797 U1 | 12/2006 |
| DE | 10 2006 041 552 A1 | 3/2008 |
| EP | 0 518 156 A2 | 12/1992 |
| EP | 1 138 697 B1 | 11/2003 |
| EP | 1 655 272 A1 | 5/2006 |
| FR | 2 958 931 | 4/2010 |
| JP | 2000-095554 A | 4/2000 |
| JP | 2001-058863 A | 3/2001 |
| JP | 2003-292357 A | 10/2003 |
| JP | 2008-127247 | 6/2008 |
| WO | WO 94/08913 A1 | 4/1994 |
| WO | WO 00/44487 A1 | 8/2000 |
| WO | WO 01/04185 A1 | 1/2001 |
| WO | WO 02/070425 A1 | 9/2002 |
| WO | WO 2006/138277 A2 | 12/2006 |
| WO | WO 2007/125311 A1 | 11/2007 |
| WO | WO 2008/145975 A1 | 12/2008 |
| WO | WO 2010/026155 A1 | 3/2010 |
| WO | WO 2010/040611 A1 | 4/2010 |
| WO | WO 2011/026720 A1 | 3/2011 |

* cited by examiner

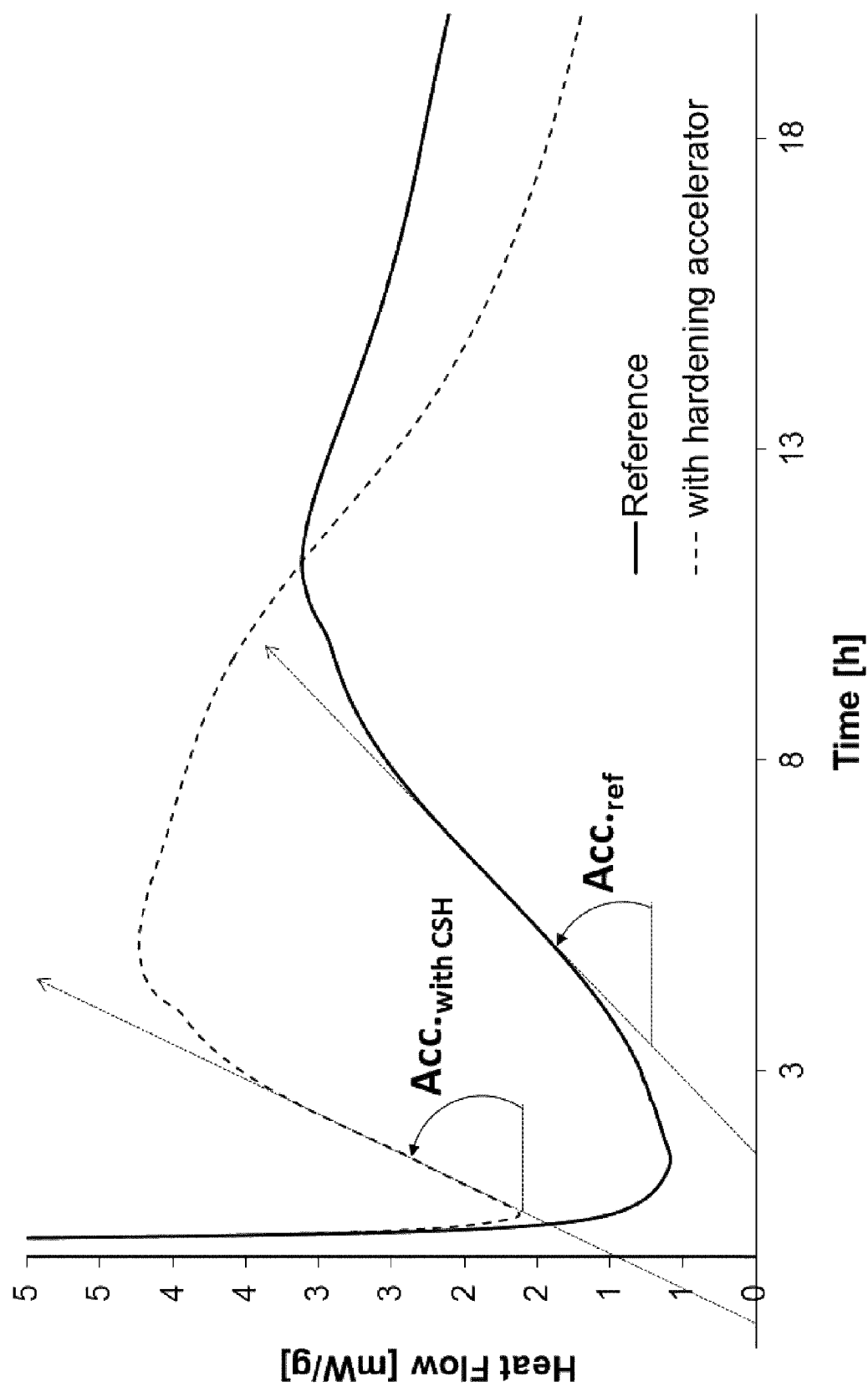

US 9,388,077 B2

HARDENING ACCELERATOR COMPOSITION

CROSS REFERENCE TO RELATED APPLICATIONS

This application is a national stage application of International Application No. PCT/EP2013/066776, filed 12 Aug. 2013, which claims priority from European Patent Application No. 12180201.1, filed 13 Aug. 2012, from which applications priority is claimed, and which are incorporated herein by reference.

The present invention relates to a process for the preparation of a hardening accelerator composition, the hardening accelerator composition obtainable by the process, its use in building material mixtures and building material mixtures containing the hardening accelerator composition obtainable by the process.

It is known that admixtures in the form of dispersants are often added to aqueous slurries of pulverulent inorganic or organic substances, such as clays, silicate powders, chalks, carbon blacks, powdered rocks and hydraulic binders, for improving their workability, i.e. kneadability, spreadability, sprayability, pumpability or flowability. Such admixtures are capable of breaking up solid agglomerates, dispersing the particles formed and in this way improving the fluidity. This effect is also utilised in a targeted manner in particular in the preparation of building material mixtures which contain hydraulic binders, such as cement, lime, gypsum, calcium sulphate hemihydrate (bassanite), anhydrous calcium sulphate (anhydrite), or latent hydraulic binders, such as fly ash, blast furnace slag or pozzolans.

In order to convert these building material mixtures based on said binders into a ready-to-use, workable form, as a rule substantially more mixing water is required than would be necessary for the subsequent hydration and hardening process. The proportion of pores which are formed in the concrete body by the excess water which subsequently evaporates leads to significantly poorer mechanical strengths and durability.

In order to reduce this excess proportion of water at a predetermined processing consistency and/or to improve the workability at a predetermined water/binder ratio, admixtures which are generally referred to as water-reducer compositions or plasticizers are used. In particular, copolymers which are prepared by free radical copolymerization of acid monomers with polyether macromonomers are used in practice as such compositions.

Furthermore, admixtures for building material mixtures comprising hydraulic binders typically also contain hardening accelerators which shorten the hardening time of the hydraulic binder. According to WO 02/070425, calcium silicate hydrate in particular present in dispersed (finely or particularly finely dispersed) form, can be used as such a hardening accelerator.

In WO 2010/026155 A1 calcium silicate hydrate suspensions are described, which are produced by reacting water-soluble calcium compounds and water-soluble silicate compounds in the presence of an aqueous solution which contains a water-soluble comb polymer suitable as a plasticizer for hydraulic binders. The accelerators of said patent application provide a progress in the art of concrete technology, as the acceleration of the hardening of cementitious compositions could be considerably improved compared to the prior art, especially without a decrease of the 28 days strength in concrete. The water-soluble comb polymer suitable as a plasticizer for hydraulic binders in WO 2010/026155 A1 comprises various chemistries with different types of acid monomers and polyether macromonomers. The acid monomers (in the formulae shown in the form of copolymerized units) can be chosen from (meth)acrylic acid derivatives according to general formula (Ia), vinyl derivatives according to formula (Ib), maleic anhydride derivatives according to general formula (Ic) and maleic acid derivatives according to general formula (Id). In general formulae (Ia), (Ib) and (Id) in each case various anionic groups, which are attached to the backbone of the comb polymer are present. The specific anionic groups, which act as a kind of anchor group to inorganic materials with a positive surface charge (the surface charge is positive due to the overcompensation effect of calcium ions at the surface of the inorganic material), can again be selected from a wide range of chemistries, e.g. carboxylic acid groups, sulphonic acid groups, phosphonic acid and phosphoric acid ester chemistries.

With respect to the chemistry of the polyether macromonomers, also various chemistries are possible. For example structures according to formula (IIa), which basically comprise alkoxylated vinyl ethers and alkoxylated alkenyl ethers with 1 to 7 carbon, atoms are disclosed. Formula (IIb) comprises as polyether macromonomer cyclic alkoxylated vinyl ethers and cyclic alkoxylated alkenyl ethers with 1 to 7 carbon atoms. Formula (IId) discloses as polyether macromonomer esters of (meth)acrylic acid with a polyalkylene glycol residue. A combination of all types of acid monomers with all types of polyether macromonomer to result into the comb polymer (usually by radical copolymerization) is possible, resulting in a rather high number of possible comb polymer structures.

The suspensions of calcium silicate hydrate disclosed in WO 2010/026155 A1 have still an improvement potential with respect to their activity as hardening accelerator, especially with respect to their dosage efficiency. This means especially that it should be possible to decrease the dosage of the hardening accelerator in order to obtain the same acceleration effect or to improve the acceleration effect at the same dosage. The economic advantage of the increase in dosage efficiency is obvious as the cost of the products decreases and the performance of the accelerators can be improved. Moreover less stock volume will be needed during production, distribution and storage of the hardening accelerators.

The object of the present invention is therefore to provide a composition which acts as an improved hardening accelerator with increased dosage efficiency. This object is achieved by a process for the preparation of a hardening accelerator composition by reaction of a water-soluble calcium compound with a water-soluble silicate compound, the reaction of the water-soluble calcium compound with the water-soluble silicate compound being carried out in the presence of an aqueous solution which contains a water-soluble comb polymer suitable as a plasticizer for hydraulic binders, wherein the water-soluble comb polymer suitable as a plasticizer for hydraulic binders is present as a copolymer which is produced by free radical polymerization in the presence of a phosphated acid monomer and a (meth)acrylic acid ester based polyether macromonomer, so that a structural unit is produced in the comb polymer by incorporation of the phosphated acid monomer in the form of polymerized units, which structural unit is in accordance with general formula (I)

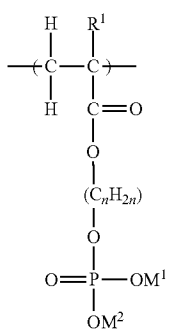

where
R¹ are identical or different and are independently of one another represented by H and/or a non-branched chain or branched $C_1$-$C_4$ alkyl group, preferably R¹ is methyl, where n=2, 3 or 4, preferably 2,
M¹ and M² are identical or different and independently from one another H and/or a cation equivalent,
and that a structural unit is produced in the comb polymer by incorporation of the (meth)acrylic acid ester based polyether macromonomer in the form of polymerized units, which structural unit is in accordance with general formula (II),

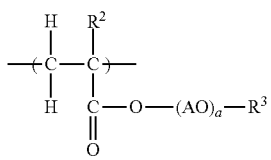

where
R² is identical or different and independently of one another, is represented by H and/or a non-branched chain or branched $C_1$-$C_4$ alkyl group, preferably R² is methyl,
A are identical or different and are represented by $C_xH_{2x}$ where x=2, 3, 4 and/or 5, preferably 2, with the proviso that at least 85 mol %, preferably at least 95 mol % of A are $C_2H_4$,
a are identical or different and are represented by an integer from 65 to 160 preferably 90 to 140,
R³ are identical or different and independently of one another are represented by H and/or a non-branched chain or a branched $C_1$-$C_4$ alkyl group, preferably a $C_1$-$C_4$ alkyl group.

The term cation equivalent means that the respective cation in the formula is divided by the number of the charge of the cation. For example in the case of alkali metal cations, (alkyl)ammonium cations and alkanolammonium cations it is divided by one, in the case of cations with two charges (e.g. earth alkali cations) it is divided by 2 resulting in ½ earth alkalication, in the case of triple charged cations (e.g. $Al^{3+}$) ⅓ $Al^{3+}$ will result.

In formula (I) preferable cations M¹ and/or M² are independently from each other alkali metal cations, (alkyl)ammonium cations, alkanolammonium cations and/or ½ earth alkali metal cations.

In principle, only relatively slightly water-soluble compounds are also suitable in each case as water-soluble calcium compounds and water-soluble silicate compounds, although readily water-soluble compounds are preferred in each case. However, it must be ensured there is a sufficient reactivity for the reaction in the aqueous environment with the corresponding reactant (either water-soluble calcium compound or water-soluble silicate compound). It is to be assumed that the reaction takes place in aqueous solution but a water-insoluble inorganic compound (calcium silicate hydrate) is usually present as a reaction product. Preferably the solubility in water at 20° C. and standard pressure of the water-soluble calcium compounds and the water-soluble silicate compounds is higher than 0.1 g/l and more preferably higher than 1 g/l.

The comb polymers used in the process according to this invention can be obtained for example by a radical polymerization of respective phosphate ester monomers and polyether macromonomers in order to result in copolymers featuring the structures of formula (I) and formula (II).

Examples of such phosphate ester monomers are hydroxyethyl(meth)acrylate phosphoric acid ester (HE(M)A-phosphate) or hydroxypropyl(meth)acrylate phosphoric acid ester (HP(M)A-phosphate). Especially preferred is hydroxyethylmethacrylate phosphoric acid ester (HEMA-phosphate). Hydroxyethyl(meth)acrylate phosphoric acid ester (HE(M)A-phosphate) can be used in its pure form or it can be used in a mixture with side products from the phosphorylation reaction of hydroxyethyl(meth)acrylate. For example it is possible that bis(hydroxyethyl methacrylate) phosphoric acid diester is formed during the phosphorylation reaction.

Compared to the disclosure of WO 2010/026155 A1 it is noted that out of the wide range of acid monomer chemistries (formulae Ia, Ib, Ic and Id) (meth)acrylic acid based structures were selected and as the specific anionic group phosphoric acid esters. The phosphate ester groups together with the selected type of polyether macromonomers surprisingly provide for an especially good control of the particle size of the calcium silicate hydrate particles (relatively small particles) and seem to be essential for obtaining improved acceleration effects.

Examples of the (meth)acrylic acid ester based polyether macromonomers are esters of (meth)acrylic acid, preferably methacrylic acid, with alkoxylated non-branched chain or branched $C_1$-$C_4$ alkyl alcohols, for example methyl polyethylene glycol (meth)acrylic acid ester, preferably methyl polyethylene glycol methacrylic acid ester. In this case R³ in general formula (II) is preferably a non-branched chain or a branched $C_1$-$C_4$ alkyl group. Preferred are also alkoxylates of (meth)acrylic acid, especially hydroxypropyl methacrylic acid, which can be propoxylated in a first step and ethoxylated in a second step. In this case R³ in general formula (II) is preferably H. An example of this kind of monomer is the product Polyglykol MA 5000 M 50 from the company Clariant. For the macromonomers in each case the conditions for the indices a (side chain length) and A (type of alkylene) must be fulfilled. The polyether side chains should be sufficiently long and hydrophilic in order to show a good acceleration effect. It is noted that out of several macromonomer options in WO 2010/026155 A1 a special chemistry was selected with surprising technical effects, as will be shown in the following text.

In the comb polymers of this invention also structural units which are different to formula (I) and formula (II) can be contained. Such units can be for example styrene and derivatives of styrene (for example methyl substituted derivatives), vinyl acetate, vinyl proprionate, butadiene, unsaturated hydrocarbons like for example ethylene, propylene, (iso)butylene, maleic acid and esters of maleic acid, (meth)acrylic acid and esters of methacrylic acid, acrylamide, alkyl acrylamides such as dimethylacrylamide or t-butylacrylamide and/ or vinyl pyrrolidone. This listing is a non-exhaustive enumeration. Preferable are monomers with not more than one carbon double bond.

Preferably the mol percentage of the sum of all structural units according to formula (I) and formula (II) with respect to all structural units in the comb polymer is higher than 60 mol %, preferably higher than 80 mol %.

Preferably the average molecular weight $M_w$ as determined by gel permeation chromatography (GPC) of the water-soluble comb-polymer suitable as a plasticizer for hydraulic binders is according to this invention from 5.000 to 200.000 g/mol, more preferably from 10.000 to 80.000 g/mol, most preferably from 20.000 to 50.000 g/mol. The polymers were analyzed by means of size exclusion chromatography with respect to average molar mass and conversion (column combination: OH-Pak SB-G, OH-Pak SB 804 HQ and OH-Pak SB 802.5 HQ from Shodex, Japan; Eluent: 80% by volume of aqueous solution of $HCO_2NH_4$ (0.05 mol/l) and 20% by volume of methanol; injection volume 100 µl; flow rate 0.5 ml/min). The calibration for determining the average molar mass was effected using linear poly(ethylene oxide) and polyethylene glycol standards. As a measure of the conversion, the peak of the copolymer is standardized to a relative height of 1 and the height of the peak of the unconverted macromonomer/PEG-containing oligomer is used as a measure of the content of residual monomer.

In principle, the accelerator contains an inorganic and an organic component. The inorganic component is finely dispersed calcium silicate hydrate, which may contain also foreign ions, such as magnesium and aluminium. The calcium silicate hydrate is prepared in the presence of the comb polymer plasticizer (organic component). Usually, a suspension containing the calcium silicate hydrate in finely dispersed form is obtained, which suspension effectively accelerates the hardening process of hydraulic binders.

The inorganic component can in most cases be described with regard to its composition by the following empirical formula:

a $CaO$, $SiO_2$, b $Al_2O_3$, c $H_2O$, d $Z_2O$, e $WO$

Z is an alkali metal

W is an alkaline earth metal, preferably W is an alkaline earth metal, which is different from calcium,

| | | |
|---|---|---|
| $0.1 \leq a \leq 2$ | preferably | $0.66 \leq a \leq 1.8$ |
| $0 \leq b \leq 1$ | preferably | $0 \leq b \leq 0.1$ |
| $1 \leq c \leq 6$ | preferably | $1 \leq c \leq 6.0$ |
| $0 \leq d \leq 1$ | preferably | $0 \leq d \leq 0.4$ |
| $0 \leq e \leq 2$ | preferably | $0 \leq e \leq 0.1$ |

In a preferred embodiment, the aqueous solution also contains, in addition to silicate and calcium ions, further dissolved ions which are preferably provided in the form of dissolved aluminium salts and/or dissolved magnesium salts. As aluminium salts preferably aluminium halogens, aluminium nitrate, aluminium hydroxide and/or aluminium sulphate can be used. More preferable within the group of aluminium halogens is aluminium chloride. Magnesium salts can be preferably magnesium nitrate, magnesium chloride and/or magnesium sulphate.

Advantage of the aluminium salts and magnesium salts is that defects in the calcium silicate hydrate can be created via the introduction of ions different to calcium and silicon.

This leads to an improved hardening acceleration effect. Preferably the molar ratio of aluminium and/or magnesium to calcium and silicon is small. More preferably the molar ratios are selected in a way that in the previous empirical formula the preferable ranges for a, b and e are fulfilled ($0.66 \leq a \leq 1.8$; $0 \leq b \leq 0.1$; $0 \leq e \leq 0.1$).

Preferably in a first process step, the water-soluble calcium compound is mixed with the aqueous solution which contains the water-soluble comb polymer suitable as a plasticizer for hydraulic binders according to this invention, so that a mixture preferably present as a solution is obtained, to which the water-soluble silicate compound is added in a subsequent second step. The water-soluble silicate compound of the second step can also contain the water-soluble comb polymer suitable as a plasticizer for hydraulic binders.

The aqueous solution may also contain one or more further solvents (for example alcohols like ethanol and/or isopropanol) in addition to water. Preferably the weight proportion of the solvent other than water to the sum of water and further solvent (e.g. alcohol) is up to 20 weight %, more preferably less than 10 weight % and the most preferably less than 5 weight %. However, most preferable are aqueous systems without any solvent other than water. The temperature range in which the process is carried out is not especially limited. Certain limits however are imposed by the physical state of the system. It is preferable to work in the range of 0 to 100° C., more preferable 5 to 80° C. and most preferable 15 to 35° C. High temperatures can be reached especially when a milling process is applied. It is preferable not to exceed 80° C. Also the process can be carried out at different pressures, preferably in a range of 1 to 5 bars.

The pH-value depends on the quantity of reactants (water-soluble calcium compound and water-soluble silicate) and on the solubility of the precipitated calcium silicate hydrate. It is preferable that the pH value is higher than 8 at the end of the synthesis, preferably in a range between 8 and 13.5, most preferably in a range between 10 and 12.5.

Preferable is a process, characterized in that the aqueous solution containing a water-soluble comb polymer according to the invention furthermore contains the water-soluble calcium compound and the water-soluble silicate compound as components dissolved in it. This means that the reaction of the water-soluble calcium compound and the water-soluble silicate compound in order to precipitate calcium silicate hydrate occurs in the presence of an aqueous solution which contains a water-soluble comb polymer according to the invention.

Preferable is a process, characterized in that a solution of a water-soluble calcium compound and a solution of a water-soluble silicate compound are added to the aqueous solution containing a water-soluble comb polymer according to the invention.

More preferable is a process in which a solution of a water-soluble calcium compound and a solution of a water-soluble silicate compound are added separately to the aqueous solution containing a water-soluble comb polymer according to the invention.

To illustrate how this aspect of the invention can be carried out, for example three solutions can be prepared separately (solution (I) of a water-soluble calcium compound, solution (II) of a water-soluble silicate compound and a solution (III) of the comb polymer). Solutions (I) and (II) are preferably separately and simultaneously added to solution (III). Advantage of this preparation method is besides its good practicability that relatively small particle sizes can be obtained.

The process can be modified in that the solution of a water soluble calcium compound and/or the solution of a water-soluble silicate compound contain a water-soluble comb polymer according to the invention. In this case the method is carried out in principle in the same way as described in the previous embodiment, but solution (I) and/or solution (II)

preferably contain also the water-soluble comb polymer according to this invention. In this case the person skilled in the art will understand that the water-soluble comb polymer is distributed to at least two or three solutions. It is advantageous that 1 to 50%, preferably 10 to 25% of the total of the water-soluble comb polymer are contained in the calcium compound solution (e.g. solution (I)) and/or silicate compound solution (e.g. solution (II)). This preparation method has the advantage that the comb polymer is present also in the solution of the water-soluble calcium compound and/or the solution of the water-soluble silicate compound.

Preferably the process can be modified in that the aqueous solution containing a water-soluble comb polymer according to the invention contains a water-soluble calcium compound or a water-soluble silicate compound.

Preferable is a process, characterized in that in formula (I) $R^1$ is methyl. In this case phosphorylated methacrylic acid ester derivatives are incorporated into the comb polymer. The methacrylic acid esters have the advantage that they are rather stable to hydrolysis in an alkaline environment. Also the shelf life of the polymers is superior. The phosphate group provides for an especially effective control of the particle size of the calcium silicate hydrate particles. It is supposed that the interaction of the phosphate anchor group with calcium silicate hydrate is especially good.

Preferable is a process, characterized in that in formula (II) $R^2$ is methyl, x=2 and/or =3, preferably $R^3$ is H. As an advantage the hydrolysis stability is superior due to the methacrylic acid structure ($R^2$=methyl). The side chain length characterized by the parameter a in formula (II) must be in the specified range in order to obtain excellent effects as hardening accelerator. Longer and shorter side chains or polyalkylene glycol side chains with a low content of ethylene glycol show less good effects as hardening accelerator.

Preferable is a process, characterized in that in formula (II) $R^3$ is methyl and x=2. In this case the polyether macromonomers are esters of (meth)acrylic acid, preferably methacrylic acid, with alkoxylated non-branched chain or branched $C_1$-$C_4$ alkyl alcohols. Examples are methyl polyethylene glycol (meth)acrylic acid ester, preferably methyl polyethylene glycol methacrylic acid ester. One example of such a monomer is Visiomer MPEG 5005 MA W, available from the company Evonik Industries AG. It is an ester of methacrylic acid and methyl polyethylene glycol with a molecular weight of 5.000 g/mol.

Preferable is a process, characterized in that the molar ratio of structural units from acid monomers according to formula (I) to structural units from polyether macromonomers according to formula (II) in the comb polymer is from 3/1 to 7/1, preferably 3.5/1 to 5.5/1. It has been found that a rather high proportion of phosphate acid monomers with respect to the polyether macromonomers is especially favourable in order to find improved effects as hardening accelerator. It is supposed that a high proportion of so-called anchor groups provides for an especially good particle size control effect of the calcium silicate hydrate, because of a good interaction with the calcium silicate hydrate being formed. Together with the good steric repulsion effect of the rather long alkylene oxide side chains it was possible to obtain especially favourable results as hardening accelerator.

Preferable is a process, characterized in that structural units are produced in the comb polymer by incorporation of carboxylic acid monomers, preferably (meth)acrylic acid. Examples of such monomers are (meth)acrylic acid, maleic acid, itaconic acid and crotonic acid. The molar ratio of structural units according to formula (I) to structural units produced in the comb polymer by incorporation of carboxylic monomers is preferable higher than 1:1, more preferably higher than 2.5:1 and most preferably higher than 4:1. Preferably the hardening accelerator composition is an aqueous hardening accelerator composition.

Preferably the comb polymers according to this invention contain more than 40 mol %, more preferably more than 60 mol % of structural units according to formula (I). Preferably the comb polymers according to this invention contain more than 10 mol %, more preferably more than 15 mol % of structural units according to formula (II). The comb polymers according to this invention contain preferably less than 20 mol % of structures, which are produced in the comb polymer by incorporation of carboxylic monomers.

In general the components are used in the following ratios:
i) 0.01 to 75, preferably 0.01 to 51, most preferably 0.01 to 15% by weight of water-soluble calcium compound,
ii) 0.01 to 75, preferably 0.01 to 55, most preferably 0.01 to 10% by weight of water-soluble silicate compound,
iii) 0.001 to 60, preferably 0.1 to 30, most preferably 0.1 to 10% by weight of water-soluble comb polymer suitable as a plasticizer for hydraulic binders,
iv) 50 to 99, most preferably 70 to 99% by weight of water.

Preferably the hardening accelerator composition is dosed at 0.01 to 10 weight %, most preferably at 0.1 to 2 weight % of the solids content with respect to the hydraulic binder, preferably (Portland) cement. The solids content is determined in an oven at 60° C. until a constant weight of the sample is reached.

Often, the water-soluble calcium compound is present as calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium hypochloride, calcium iodate, calcium iodide, calcium lactate, calcium nitrite, calcium oxalate, calcium phosphate, calcium propionate, calcium silicate, calcium stearate, calcium sulphate, calcium sulphate hemihydrate, calcium sulphate dihydrate, calcium sulphide, calcium tartrate calcium aluminate, tricalcium silicate and/or dicalcium silicate. Preferably the water-soluble calcium compound is not a calcium silicate. The silicates calcium silicate, dicalcium silicate and/or tricalcium silicate are less preferred because of low solubility (especially in the case of calcium silicate) and for economic reasons (price) (especially in case of dicalcium silicate and tricalcium silicate).

The water-soluble calcium compound is preferably present as calcium citrate, calcium tartrate, calcium formate, calcium acetate, calcium nitrate and/or calcium sulphate. Advantage of these calcium compounds is their non-corrosiveness. Calcium citrate and/or calcium tartrate are preferably used in combination with other calcium sources because of the possible retarding effect of these anions when used in high concentrations.

Often, the water-soluble silicate compound is present as sodium silicate, potassium silicate, waterglass, aluminium silicate, tricalcium silicate, dicalcium silicate, calcium silicate, silicic acid, sodium metasilicate and/or potassium metasilicate.

The water-soluble silicate compound is preferably present as sodium metasilicate, potassium metasilicate and/or waterglass. Advantage of these silicate compounds is their extremely good solubility in water.

Preferably species of different types are used as the water-soluble silicate compound and as the water-soluble calcium compound.

In a preferred embodiment of the invention the process is characterized in that polycondensates containing (I) at least one structural unit consisting of an aromatic or heteroaromatic moiety bearing a polyether side chain, preferably a poly alkylene glycol side chain, more preferably a poly ethylene glycol side chain and (II) at least one structural unit consisting of an aromatic or heteroaromatic moiety bearing at least one phosphoric acid ester group and/or its salt are present in the aqueous solution which contains a water-soluble comb polymer according to this invention.

Preferably the aqueous solution in which the reaction is carried out contains besides the comb polymer according to this invention a second polymer. The second polymer is a polycondensate as described in the previous text of this embodiment and in WO2010/026155 A1. It is preferable to use the polycondensates of WO2010/026155 A1 as a second polymer together with the comb polymers of this invention.

The polycondensates according to this embodiment are known in the prior art (US 20080108732 A1) to be effective as a superplasticizer in cementitious compositions and they have been described in WO2010/0216 as an additive during the production of calcium silicate hydrate suspension.

Typically the polycondensate contains (I) at least one structural unit consisting of an aromatic or heteroaromatic moiety bearing a polyether side chain, preferably a polyalkylene glycol side chain, more preferably a polyethylene glycol side chain. The polyether side chain comprises preferably 1 to 300, in particular 3 to 200 and particularly preferably 5 to 150 alkylene glycol units, preferably ethylene glycol units. The structural unit consisting of an aromatic or heteroaromatic moiety bearing a polyether side chain, preferably a polyethylene glycol side chain is selected preferably from the group of alkoxylated, preferably ethoxylated, hydroxy-functionalized aromates or heteroaromates (for example the aromates can be selected from phenoxyethanol, phenoxypropanol, 2-alkoxyphenoxyethanols, 4-alkoxyphenoxyethanols, 2-alkylphenoxyethanols, 4-alkylphenoxyethanols) and/or alkoxylated, preferably ethoxylated, amino-functionalized aromates or heteroaromates (for example the aromates can be selected from N,N-(Dihydroxyethyl)aniline, N,-(Hydroxyethyl)aniline, N,N-(Dihydroxypropyl)aniline, N,-(Hydroxypropyl)aniline). More preferable are alkoxylated phenol derivatives (for example phenoxyethanol or phenoxypropanol), most preferable are alkoxylated, especially ethoxylated phenol derivatives featuring weight average molecular weights between 300 g/mol and 10,000 g/mol (for example polyethylenglycol monophenylethers).

Typically the polycondensate contains (II) at least one phosphated structural unit consisting of an aromatic or heteroaromatic moiety bearing at least one phosphoric acid ester group and/or a salt of the phosphoric acid ester group, which is selected preferably from the group of alkoxylated hydroxy-functionalized aromates or heteroaromates (for example phenoxyethanol phosphate, polyethylenglycol monophenylether phosphates) and/or alkoxylated amino-functionalized aromates or heteroaromates (for example N,N-(Dihydroxyethyl) aniline diphosphate, N,N-(Dihydroxyethyl)aniline phosphate, N,-(Hydroxypropyl)aniline phosphate), which bear at least one phosphoric acid ester group and/or a salt of the phosphoric acid ester group (e.g. by esterification with phosphoric acid and optional addition of bases). More preferable are alkoxylated phenols bearing at least one phosphoric acid ester group and/or a salt of the phosphoric acid ester group (for example polyethylenglycol monophenylether phosphates with less than 25 ethylene glycol units) and most preferable are the respective alkoxylated phenols featuring weight average molecular weights between 200 g/mol and 600 g/mol (for example phenoxyethanol phosphate, polyethylenglycol monophenylether phosphates with 2 to 10 ethyleneglycol units), the alkoxylated phenols bearing at least one phosphoric acid ester group and/or a salt of the phosphoric acid ester group (e.g. by esterification with phosphoric acid and optional addition of bases). Typically the polycondensation reaction is carried out with formaldehyde under acid conditions. Frequently, the phosphated polycondensate has a weight average molecular weight of 5.000 g/mol to 200.000 g/mol, preferably 10.000 to 100.000 g/mol and particularly preferably 15.000 to 55.000 g/mol. The phosphated polycondensate can be present also in form of its salts, as for example the sodium, potassium, organic ammonium, ammonium and/or calcium salt, preferably as the sodium and/or calcium salt.

Preferably the process of this invention is carried out completely or partially in the presence of an aqueous solution containing a viscosity enhancer polymer, selected from the group of polysaccharide derivatives and/or (co)polymers with an average molecular weight $M_w$ higher than 500.000 g/mol, more preferably higher than 1,000,000 g/mol, the (co) polymers containing structural units derived (preferably by free radical polymerization) from non-ionic (meth)acrylamide monomer derivatives and/or sulphonic acid monomer derivatives. It is possible that the viscosity enhancer polymer is added at the beginning, during the process or at the end of the process. For example it can be added to the aqueous solution of the comb polymer, to the calcium compound and/or the silicate compound. The viscosity enhancer has a stabilizing function in that segregation (aggregation and sedimentation) of for example calcium silicate hydrate) can be prevented. Preferably the viscosity enhancers are used at a dosage from 0.001 to 10 weight %, more preferably 0.001 to 1 weight % with respect to the weight of the hardening accelerator suspension.

As polysaccharide derivative preference is given to cellulose ethers, for example alkylcelluloses such as methylcellulose, ethylcellulose, propylcellulose and methylethylcellulose, hydroxyalkylcelluloses such as hydroxyethylcellulose (HEC), hydroxypropylcellulose (HPC) and hydroxyethylhydroxypropylcellulose, alkylhydroxyalkylcelluloses such as methylhydroxyethylcelluose (MHEC), methylhydroxypropylcelluose (MHPC) and propylhydroxypropylcellulose. Preference is given to the cellulose ether derivatives methylcellulose (MC), hydroxypropylcellulose (HPC), hydroxyethylcellulose (HEC) and ethylhydroxyethylcellulose (EHEC), and particular preference is given to methylhydroxyethylcelluose (MHEC) and methylhydroxypropyl-celluose (MHPC). The abovementioned cellulose ether derivatives, which can in each case be obtained by appropriate alkylation or alkoxylation of cellulose, are preferably present as non ionic structures, however it would be possible to use for example also carboxymethylcellulose (CMC). In addition, preference is also given to using non ionic starch ether derivatives such as hydroxypropylstarch, hydroxyethylstarch and methyl-hydroxypropylstarch. Preference is given to hydroxypropylstarch. Preferable are also microbially produced polysaccharides such as welan gum and/or xanthans and naturally occurring polysaccharides such as alginates, carregeenans and galactomannans. These can be obtained from appropriate natural products by extractive processes, for example in the case of alginates and carregeenans from algae, in the case of galactomannans from carob seeds.

The viscosity enhancer (co)polymers with a weight average molecular weight $M_w$ higher than 500,000 g/mol, more preferably higher than 1,000,000 g/mol can be produced (preferably by free radical polymerization) from non-ionic (meth)acrylamide monomer derivatives and/or sulphonic acid monomer derivatives. The respective monomers can be selected for example from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or sulphonic acid monomer derivatives selected from the group of styrene sulphonic acid, 2-acrylamido-2-methylpropanesulphonic acid, 2-methacrylamido-2-methylpropanesulphonic acid, 2-acrylamidobutanesulphonic acid, and/or 2-acrylamido-2,4,4-trimethylpentanesulphonic acid or the salts of the acids mentioned. It is preferable that the viscosity enhancer contains more than 50 mol %, more preferably more than 70 mol % of structural units derived from non-ionic (meth)acrylamide monomer derivatives and/or sulphonic acid monomer derivatives. Other structural units preferably being contained in the copolymers can be derived from for example the monomers (meth)acrylic acid, esters of (meth)acrylic acid with branched or non-branched C1 to C10 alcohols, vinyl acetate, vinyl proprionate and/or styrene.

Preferably the viscosity enhancer polymer is a polysaccharide derivative selected from the group of methylcellulose, hydroxyethylcellulose (HEC), hydroxypropylcellulose (HPC), methylhydroxyethylcellulose (MHEC), methylhydroxypropylcellulose (MHPC) and/or (co)polymers with an average molecular weight $M_w$ higher than 500,000 g/mol, more preferably higher than 1,000,000 g/mol, the (co)polymers containing structural units derived (preferably by free radical polymerization) from non-ionic (meth)acrylamide monomer derivatives selected from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or sulphonic acid monomer derivatives selected from the group of 2-acrylamido-2-methylpropanesulphonic acid, 2-methacrylamido-2-methylpropanesulphonic acid, 2-acrylamidobutanesulphonic acid, and/or 2-acrylamido-2,4,4-trimethylpentanesulphonic acid or the salts of the acids mentioned.

Within the group of non-ionic (meth)acrylamide monomer derivatives preference is given to methylacrylamide, N,N-dimethylacrylamide and/or methacrylamide, and particular preference is given to acrylamide. Within the group of sulphonic acid monomers 2-acrylamido-2-methylpropanesulphonic acid (AMPS) and its salts are preferable. The viscosity enhancer polymers can be added at the beginning of the process or at any other time.

Preferably the process of this invention is carried out completely or partially in the presence of an aqueous solution containing hardening accelerators selected from the group of alkanolamines, preferably triisopropanolamine and/or tetrahydroxyethyl ethylene diamine (THEED). Preferably the alkanolamines are used at a dosage from 0.01 to 2.5 weight % with respect to the weight of hydraulic binder, preferably cement. Synergistic effects could be found when using amines, especially triisopropanolamine and tetrahydroxyethyl ethylene diamine, with respect to the early strength development of hydraulic binder systems, especially cementitious systems. Preferably the amine is added at the end of the reaction.

Preferably the process products contain setting retarders, which are selected from the group of citric acid, tartaric acid, gluconic acid, phosphonic acid, amino-trimethylenphosphonic acid, ethylendiaminotetra(methylenphosphonic) acid, diethylentriaminopenta(methylenphosphonic) acid, in each case including the respective salts of the acids, pyrophosphates, pentaborates, metaborates and/or sugars (e.g. glucose, molasses). The setting retarders can be added during the production process or afterwards. The advantage of the addition of setting retarders is that the open time can be controlled and in particular if necessary can be prolonged. The term "open-time" is understood by the person skilled in the art as the time interval after preparing the hydraulic binder mixture until the point of time at which the fluidity is considered as not sufficient anymore to allow a proper workability and the placement of the hydraulic binder mixture. The open-time depends on the specific requirements at the job site and on the type of application. As a rule the precast industry requires between 30 and 45 minutes and the ready-mix concrete industry requires about 90 minutes of open-time. Preferably the setting retarders are used at a dosage from 0.01 to 0.5 weight % with respect to the weight of hydraulic binder, preferably cement. The retarders can be added at the beginning of the process or at any other time.

Preferable is a process characterized in that the hardening accelerator composition contains no (Portland) cement or that less than 20 weight % of (Portland) cement with respect to the total weight of the hardening accelerator composition is contained. Preferably the process is carried out in the absence of (Portland) cement and the obtained hardening accelerator does not contain (Portland) cement. Most preferably the hardening accelerator composition does not contain (Portland) cement or contains less than 10 weight % (Portland) cement. In this case the water content of the hardening accelerator is no more than 80 weight %.

Preferably the water/cement ratio (W/C) of the hardening accelerator composition is higher than 1, more preferably higher than 2, most preferably higher than 10.

Preferred is a process for the preparation of the hardening accelerator composition, followed by a process step in which the hardening accelerator composition is dried, preferably by a spray drying process. Preferably the hardening accelerator composition obtained according to any of the above mentioned embodiments is dried, preferably by a spray drying process. The drying method is not especially limited, another possible drying method is for example the use of a fluid bed dryer. It is generally known that water, also if only in low quantities, is detrimental to many binders, especially cement, because of undesired premature hydration processes. Powder products with their typically very low content of water are advantageous compared to aqueous systems because it is possible to mix them into (Portland) cement and/or other binders like $CaSO_4$ based binders (e.g. calcium sulphate hemihydrate (bassanite), anhydrous calcium sulphate), slags, preferably ground granulated blast furnace slag, fly ash, silica dust, metakaolin, natural pozzolan, calcined oil shale, calcium sulphoaluminate cement and/or calcium aluminate cement.

The invention furthermore relates to a hardening accelerator composition which is obtainable by the process described above. Preferably the hardening accelerator composition contains i) 0.1 to 75, preferably 0.1 to 50, the most preferably 0.1 to 10% by weight of calcium silicate hydrate, ii) 0.001 to 60, preferably 0.1 to 30, most preferably 0.1 to 10% by weight of water-soluble comb polymer suitable as a plasticizer for hydraulic binders, iii) 50 to 99, most preferably 70 to 99% by weight of water.

Typically the calcium silicate hydrate in the composition, preferably aqueous hardening accelerator suspension, is foshagite, hillebrandite, xonotlite, nekoite, clinotobermorite, 9 Å—tobermorite (riversiderite), 11 Å—tobermorite, 14 Å—tobermorite (plombierite), jennite, metajennite, calcium chondrodite, afwillite, α—C$_2$SH, dellaite, jaffeite, rosenhahnite, killalaite and/or suolunite.

More preferably the calcium silicate hydrate in the composition, preferably aqueous hardening accelerator suspension, is xonotlite, 9 Å—tobermorite (riversiderite), 11 Å—tobermorite, 14 Å—tobermorite (plombierite), jennite, metajennite, afwillite and/or jaffeite.

In a preferred embodiment of the invention the molar ratio of calcium to silicon in the calcium silicate hydrate in the composition, preferably aqueous hardening accelerator suspension, is from 0.6 to 2, preferably 1.1 to 1.8, more preferably 1.1 to 1.5.

In a further preferred embodiment of the invention the molar ratio of calcium to water in the calcium silicate hydrate is from 0.6 to 6, preferably 0.6 to 4.

The particle size distribution of the hardening accelerator compositions were measured by the analytical ultracentrifugation method in analogy to the methods disclosed in WO2010/026155 A1. The particle size distribution was found to be below 400 nm.

Preferably the hardening accelerator composition obtainable by one of the processes of this invention, preferably aqueous hardening accelerator suspension, has a particle diameter smaller than 500 nm, preferably smaller than 300 nm, more preferably smaller than 200 nm, the particle size of the calcium silicate hydrate being measured by analytical ultracentrifugation.

Preferably the measurement of the particle diameter is done at a temperature of 25° C. via the analytical ultra centrifuge Beckman Model Optima XLI from Beckman Coulter GmbH.

According to the description in H. Cölfen, 'Analytical Ultracentrifugation of Nanoparticles', in *Encyclopedia of Nanoscience and Nanotechnology*, (American Scientific Publishers, 2004), pp. 67-88, the particle size distribution is measured via analytical ultracentrifugation as described in the following chapter. For the measurement the commercially available analytical ultra centrifuge "Beckman Model Optima XLI," from Beckman Coulter GmbH, 47807 Krefeld is used.

The samples are diluted with water to a suitable concentration. This concentration is typically between 1 and 40 g/l solid content of the sample. Preferably a relatively high dilution is chosen. The concentration to be chosen is preferably adapted according to the content of the calcium silicate hydrate particles in the sample to be analyzed. The suitable range can be easily found by the person skilled in the art and is particularly determined by the factors transparency of the sample and the measuring sensitivity. Typically the rotation speed of the ultracentrifuge is selected in the range from 2,000 to 20,000 rotations per minute (in the examples of FIG. 2 the rotation speed was 10,000 rotations per minute). The rotation speed can be chosen according to the needs of the specific sample, a higher speed of the ultracentrifuge will be preferably chosen when relatively small particles are involved and vice versa. The sedimentation rate s of the calcium silicate hydrate particles is measured with interference optics at 25° C. and is extracted from the interference data by a suitable evaluation software, for example Sedfit (http://www.analyticalultracentrifugation.com/default.htm).

According to the Stokes-Einstein Equation $$d = \sqrt{\frac{18\eta s}{\Delta\rho}}$$

the diameter of the particles d can be calculated with the measured sedimentation rate s.

η is the dynamic viscosity of the medium and was measured at 25° C. with a Brookfield LVDV-I viscosimeter at a rotation speed of 5 rounds per minute with the spindle number 1. s is the sedimentation rate of the particles.

Δρ is the difference of density at 25° C. between the calcium silicate hydrate particles and the medium. The density of the calcium silicate hydrate particles is estimated to be 2.1 g/cm$^3$ according to a comparison with literature data. The density of the medium is estimated to be 1 g/cm$^3$ (for a diluted aqueous solution). The influence of Δρ on the absolute values of the particle diameter d is supposed to be small and therefore the influence of the estimation of Δρ is also small.

The hardening accelerator compositions, preferably aqueous hardening accelerator suspensions, can also contain any formulation component typically used in the field of construction chemicals, preferably defoamers, air entrainers, retarders, shrinkage reducers, redispersible powders, other hardening accelerators, anti-freezing agents and/or anti-efflorescence agents.

The invention concerns also the use of a hardening accelerator composition obtainable by any of the processes according to this invention in building material mixtures containing (Portland)cement, Portland clinker, slag, preferably ground granulated blast furnace slag, fly ash, silica dust, metakaolin, natural pozzolans, calcined oil shale, calcium sulpho aluminate cement and/or calcium aluminate cement, preferably in building material mixtures which contain (Portland)cement as a hydraulic binder. Preferably the use is for accelerating the hardening of the building material mixtures containing said binders. Preferably the hardening accelerators are used for accelerating the hardening of aqueous suspensions of building material mixtures containing (Portland)cement, Portland clinker, slag, preferably ground granulated blast furnace slag, fly ash, silica dust, metakaolin, natural pozzolans, calcined oil shale, calcium sulpho aluminate cement and/or calcium aluminate cement, preferably in building material mixtures which contain (Portland)cement as a hydraulic binder. Preferably the water/binder ratio (W/B ratio) in the aqueous suspension of building material mixtures is from 0.1 to 0.75, more preferably from 0.25 to 0.6.

Preferably the hardening accelerators are used in mixtures of CaSO$_4$ based binders (e.g. anhydrite and hemihydrate) and the binders mentioned in the before standing list.

Preferably the hardening accelerators are used in mixtures of CaSO$_4$ based binders (e.g. anhydrite and hemihydrate) and (Portland) cement. The proportion of CaSO$_4$ based binders can be up to 95 weight % of the mixture.

The invention also concerns building material mixtures containing a hardening accelerator composition obtainable by any of the processes according to this invention and (Portland) cement, Portland clinker, slag, preferably ground granulated blast furnace slag, fly ash, silica dust, metakaolin, natural pozzolans, calcined oil shale, calcium sulpho aluminate cement and/or calcium aluminate cement. Preferably the building material mixtures contain substantially (Portland)

cement as a hydraulic binder. The hardening accelerator composition is contained in the building material mixture preferably at a dosage of 0.05 weight % to 5 weight % with respect to the clinker weight.

For illustration the term building material mixtures can mean mixtures in dry or aqueous form and in the hardened or plastic state. Dry building material mixtures could be for example mixtures of said binders, preferably cement and the hardening accelerator compositions (preferably in powder form) according to this invention. Mixtures in aqueous form, usually in the form of slurries, pastes, fresh mortar or fresh concrete are produced by the addition of water to the binder component(s) and the hardening accelerator composition, they transform then from the plastic to the hardened state.

EXAMPLES

Comb polymers (samples 1 to 13) and comparative comb polymers (samples 14 (C) to 22 (C)) were produced according to the following general instructions. The respective weights of each monomer and other agents used during the polymerization are summarized in table 1.
General Instructions for Polymerization of the Comb Polymers:
Procedure A:

A glass reactor is equipped with mechanical stirrer, thermometer and dosage pumps. It is then charged with the respective amount of water in table 1a and heated to 80° C. Three feeds are dosed simultaneously into the reactor for 60 minutes. Feed A contains both the MPEG-MA monomer which sometimes contains methacrylic acid as indicated in the table 1a and the HEMA-phosphate monomer in the relative amounts given in Table 2. Feed B contains 10% sodiumperoxodisulfate solution in water and Feed C contains 2-Mercaptoethanol 20% in water. The three feeds are stopped after 60 minutes, the temperature is kept at 80° C. for another 30 minutes. Afterwards the mixture is allowed to cool down to room temperature and neutralized to pH 7 with NaOH. The solid content is then adjusted to the given values by adding appropriate amounts of water. The polymer P20C is an exception to this rule as all monomers, sodiumperoxodisulfate and 2-Mercaptoethanol are introduced into the reactor and then the temperature is kept at 80° C. for one hour (one pot reaction).

Visiomer MPEG 5005 MA W is available from the company Evonik Industries AG. It is an ester of methacrylic acid and methyl polyethylene glycol with a molecular weight of 5,000 g/mol. Purified Visiomer MA 5005 W means that methacrylic acid (by-product) was removed by filtration over aluminium oxide of a diluted solution of Visiomer MA 5005 W.

TABLE 1a

Details of polymerization conditions (procedure A)

| Polymer | $H_2O$ in reactor (g) | MPEG-MA and $H_2O$ (g) | HEMA-Phosphate (g) | $Na_2S_2O_8$ (g) | 2-Mercaptoethanol (g) |
|---|---|---|---|---|---|
| P1 | 30 | 809.7 (24.7% purified Visiomer MA 5005 W) | 49.6 | 2.2 | 3.2 |
| P2 | 30 | 400 (50% Visiomer MA 5005 W) | 49.6 | 2.2 | 3.2 |

TABLE 1a-continued

Details of polymerization conditions (procedure A)

| Polymer | $H_2O$ in reactor (g) | MPEG-MA and $H_2O$ (g) | HEMA-Phosphate (g) | $Na_2S_2O_8$ (g) | 2-Mercaptoethanol (g) |
|---|---|---|---|---|---|
| P3 | 30 | 800 (25% purified Visiomer MA 5005 W) | 39.7 | 1.9 | 2.5 |
| P4 | 30 | 800 (25% purified Visiomer MA 5005 W) | 59.6 | 2.7 | 2.5 |
| P5 | 36 | 516 (46.5% Visiomer MA 5005 W) | 47.6 | 2.3 | 3.8 |
| P6 | 36 | 516 (46.5% Visiomer MA 5005 W) | 71.5 | 3.2 | 4.5 |
| P7 | 300 | 4301 (46.5% Visiomer MA 5005) | 496 | 22.9 | 28 |
| P8 (C) | 90 | 200 (50% purified MPEG1000-MA) | 74.4 | 3.8 | 3.0 |
| P14C | 40 | 250 (50% purified MPEG500-MA) | 31 | 3.6 | 2.0 |
| P15C | 90 | 200 (50% purified MPEG1000-MA) | 74.5 | 3.8 | 3.0 |
| P16C | 120 | 400 (50% purified MPEG1100-MA) | 45 | 3.5 | 4.0 |
| P17C | 120 | 400 (50% purified MPEG1100-MA) | 90 | 5.2 | 4.0 |
| P18C | 120 | 400 (50% purified MPEG1100-MA) | 135 | 6.9 | 6.0 |
| P19C | 100 | 610 (47.2% MPEG2000-MA) | 107.2 | 5.5 | 6.0 |
| P20C | One pot | 322 46.6% Visiomer MA 5005 W) | 37.2 | 2.5 | 3.0 |
| P21C | 50 | 305 (47.2% MPEG2000-MA) | 35.7 | 2.1 | 2.4 |
| P22C | 50 | 305 (47.2% MPEG2000-MA) | 71.5 | 3.4 | 4.0 |

Procedure B:

A glass reactor is equipped with mechanical stirrer and a thermometer. It is charged with all monomers, $FeSO_4 \times 7H_2O$, Brüggolit FF06 (available from Brüggemann) and 3-mercaptopropionic acid. Polymerization is started by adding 30% hydrogen peroxide solution. After 15 minutes the pH is adjusted to 7 using NaOH and water is added to adjust the solid content.

TABLE 1b

Details of polymerization conditions (procedure B)

| Polymer | Brüggolit FF06 | MPEG-MA and $H_2O$ (g) | HEMA-Phosphate (g) | 3-Mercaptopropionic acid (g) | $FeSO_4 \times 7H_2O$ (g) | $H_2O_2$ 30% (g) |
|---|---|---|---|---|---|---|
| P9 | 5.7 | 626 (47.9% Visiomer MA 5005 W) | 84 | 10 | 0.2 | 4.8 |
| P10 | 5.7 | 626 (47.9% Visiomer MA 5005 W) | 67.8 | 10 | 0.2 | 4.8 |
| P11 | 5.7 | 626 (47.9% Visiomer MA 5005 W) | 94.9 | 10 | 0.2 | 4.8 |
| P12 | 5.7 | 626 (47.9% Visiomer MA 5005 W) | 75.6 | 10 | 0.2 | 4.8 |
| P13 | 5.7 | 626 (47.9% Visiomer MA 5005 W) | 67 | 10 | 0.2 | 4.8 |

Table 2 gives an overview of the monomer compositions of all comb polymers according to this invention and the comparative examples (are marked (C)) and further data like the weight average molecular weight $M_w$ and the solids content of each comb polymer.

TABLE 2

Details of the molar ratios of the polymers, $M_w$ and solid content

| Polymer | HEMA-Phosphate | MPEG-2000MA | MPEG-5000MA | MPEG-1000MA | MPEG-500MA | Methacrylic Acid | $M_w$ (g/mol) | Solid Content (%) |
|---|---|---|---|---|---|---|---|---|
| P 1 | 5 | | 1 | | | | 36600 | 0.29 |
| P 2 | 5.0 | | 1 | | | 1.30 | 41600 | 0.29 |
| P 3 | 4.0 | | 1 | | | | 36400 | 0.28 |
| P 4 | 6.0 | | 1 | | | | 41500 | 0.27 |
| P 5 | 4 | | 1 | | | 1.3 | 26000 | 0.445 |
| P 6 | 6.0 | | 1 | | | 1.3 | 31000 | 0.454 |
| P 7 | 5 | | 1 | | | 1.3 | 33000 | 0.425 |
| P 8 (C) | 3 | | | 1 | | | 25300 | 0.369 |
| P 9 | 5.3 | | 1 | | | 1.3 | 33747 | 0.409 |
| P 10 | 4.3 | | 1 | | | | 30877 | 0.414 |
| P 11 | 6.2 | | 1 | | | 1.3 | 36088 | 0.412 |
| P 12 | 5.3 | | 1 | | | 1.3 | 35152 | 0.414 |
| P 13 | 4.5 | | 1 | | | 1.3 | 29026 | 0.407 |
| P 14 (C) | 0.5 | | | | 1 | | 27000 | 0.22 |
| P 15 (C) | 3 | | | 1 | | | 32100 | 0.333 |
| P 16 (C) | 1 | | | 1 | | | 16500 | 0.30 |
| P 17 (C) | 2 | | | 1 | | | 22500 | 0.28 |
| P 18 (C) | 3 | | | 1 | | | 23900 | 0.29 |
| P 19 (C) | 3.0 | 1 | | | | 1.6 | 23330 | 0.44 |
| P 20 (C) | 5 | 1 | | | | 1.6 | 33544 | 0.449 |

TABLE 2-continued

Details of the molar ratios of the polymers, $M_w$ and solid content

| Polymer | HEMA-Phosphate | MPEG-2000MA | MPEG-5000MA | MPEG-1000MA | MPEG-500MA | Methacrylic Acid | $M_w$ (g/mol) | Solid Content (%) |
|---|---|---|---|---|---|---|---|---|
| P 21 (C) | 2.0 | 1 | | | | 1.6 | 25986 | 0.393 |
| P 22 (C) | 4.0 | 1 | | | | 1.6 | 27902 | 0.38 |

In table 2 the abbreviation HEMA-Phosphate means hydroxyethylmethacrylate phosphoric acid ester, MPEG#MA means in each case the methylpolyethylenglycole methacrylic acid ester with the number (#) indicating the respective molecular weight of the monomer.

The comparison examples differ in particular in the type of anchor group (non phosphate anchor group, like for example in the polycarboxylate ether Glenium® ACE30) and in the side chain length of the polyether macromonomer).

The comb-type polymer Glenium® ACE30 is a commercialized polycarboxylate ether (obtainable from BASF Italia S.p.A.) basing on the monomers maleic acid, acrylic acid, vinyloxybutyl-polyethyleneglycol—5800 ($M_w$=40,000 g/mol (measured by G.P.C); the solid content of the sample is 45 weight %).

Synthesis of Hardening Accelerators

A calcium nitrate solution, labelled A, is prepared as follows: 40.69 g of anhydrous calcium nitrate powder is stirred with 39.1 g of water at 20° C. until complete dissolution. A sodium silicate solution, labelled B, is prepared as follows: 26.91 g of anhydrous $Na_2SiO_3$ powder is mixed with 70.1 g of water at 20° C. until complete dissolution. A third solution (labelled C) of the respective polymer (please compare table 2 for the polymers; in the case of Acc.23 (C) Glenium® ACE30 was used) is prepared as follows: 16.2 g (calculated as 100% polymer) of the respective comb polymer is dispersed in 16.6 g of water.

After preparation of the solutions A, B and C (for feeding) 22.96 (calculated as 100% polymer) g of the respective comb polymer (please compare table 2), is dispersed in 310 g of water and this dispersion is introduced into the reactor.

Under stirring the solutions A (81.42 g/h), B (98.45 g/h) and C (32.78 g/h) are fed into the reactor, the feeding rates of each solution are given in brackets. The synthesis is carried out at 20° C. under efficient stirring conditions. After the addition was finished it is stirred for another 30 minutes.

The solid content of the accelerator suspensions is measured by drying 3 g+/−0.1 g of the suspension in a crucible in porcelain 24 hours in an oven at 60° C.

The active solid content is calculated with the following method. We consider that the active content is the total solid weight (given by the measured solid content) minus the organic part, minus the sodium ions and minus the nitrate ions. The organic part, the sodium and nitrate ions are simply deducted from syntheses. The solid content of the samples and the content of C-S-H) is given in detail in table 3.

Calorimetric Experiments

It is known that the hardening of cement mainly comes from the hydration of anhydrous silicate phases (H. F: W. Taylor, The cement chemistry, 2nd Edition, 1997). The hydration may be monitored by isothermal calorimetry as represented in FIG. 1.

In the following the calorimetric measurement method is to be explained. In the experiments the heat evolution of a sample of cement without hardening accelerator and with a hardening accelerator (blank) was tested. The dosage of the hardening accelerator composition (table 3) was 0.35 weight % of C-S-H with respect to the cement weight. The water to cement ratio is in each case 0.5. FIG. 1 represents an example of the heat flow evolution over time.

FIG. 1: Heat Flow Evolution of a Cement Paste (Example)

The heat flow released during the hydration is measured by calorimetry and is proportional to the hydration rate of cement. The hydration acceleration can be therefore described by the first derivate of the heat flow with time. The performances of the hardening accelerator suspensions are estimated with the ratio:

$$A = \frac{Acc_{*with\ CSH}}{ACC_{*ref}}$$

The acceleration values, which are characteristic for the acceleration effect provided by the hardening accelerator compositions are listed in table 3.

TABLE 3

Details of the hardening accelerators and acceleration

| Accelerator Sample | Polymer | Total solid content | CSH solid content | Acceleration (A) |
|---|---|---|---|---|
| Acc. 1 | P 1 | 19.81% | 5.77% | 3.74 |
| Acc. 2 | P 2 | 19.94% | 5.90% | 3.15 |
| Acc. 3 | P 3 | 19.93% | 5.84% | 3.33 |
| Acc. 4 | P 4 | 19.97% | 5.89% | 3.35 |
| Acc. 5 | P 5 | 19.96% | 5.87% | 3.5 |
| Acc. 6 | P 6 | 20.43% | 6.34% | 3.1 |
| Acc. 7 | P 7 | 20.29% | 6.20% | 3.08 |
| Acc. 8 (C) | P 8 (C) | 20.38% | 6.29% | 1.6 |
| Acc. 9 | P 9 | 20.33% | 5.92% | 3.18 |
| Acc. 10 | P 10 | 20.37% | 5.95% | 3.15 |
| Acc. 11 | P 11 | 20.27% | 6.06% | 3.04 |
| Acc. 12 | P 12 | 20.34% | 5.93% | 3.2 |
| Acc. 13 | P 13 | 20.38% | 5.97% | 3.43 |
| Acc. 14 (C) | P 14 (C) | 19.96% | 5.87% | 1.31 |
| Acc. 15 (C) | P 15 (C) | 20.23% | 6.14% | 1.4 |
| Acc. 16 (C) | P 16 (C) | 20.34% | 6.26% | 0.88 |
| Acc. 17 (C) | P 17 (C) | 20.12% | 6.04% | 1.38 |
| Acc. 18 (C) | P 18 (C) | 20.14% | 6.05% | 1.49 |
| Acc. 19 (C) | P 19 (C) | 20.37% | 6.28% | 1.6 |
| Acc. 20 (C) | P 20 (C) | 20.27% | 6.19% | 1.58 |
| Acc. 21 (C) | P 21 (C) | 20.29% | 6.20% | 1.9 |
| Acc. 22 (C) | P 22 (C) | 20.25% | 6.16% | 1.54 |
| ACC. 23 (C) | Glenium ® ACE30 | 20.27% | 6.20% | 2.43 |

The water to cement ratio is kept constant to 0.5 for all experiments as well as the dosage of the hardening accelerator composition. The dosage is 0.35 weight % of C-S-H with respect to the weight of cement. The temperature is 20° C. An acceleration of 1 does not give any improvement compared to the reference (blank without accelerator additive), an acceleration of 2 doubles the hydration rate in the first hours compared to the reference. In table 3, the accelerations obtained with the different accelerator compositions are shown. It becomes clear that compared to the references the acceleration values are considerably higher, which means also a better dosage efficiency.

Concrete Tests—Compressive Strength
Preparation and Concrete Formulation

According to DIN-EN 12390, concrete mixes (given for 1 m³) were prepared:
- 380 kg of cement
- 123 kg of quartz sand 0/0.5
- 78 kg of quartz sand 0/1
- 715 kg of sand 0/4
- 424 kg of gravel (4/8)
- 612 kg of gravel (8/16)
- 159.6 liters of water
- the water-to-cement ratio (W/C) is 0.42;
- and additives like for example plasticizer and accelerator.

Two types of cement were used as indicated in table 4. The quantity of superplasticizer is adapted in order to have initially the same slump flow at +/−2 cm.

The dosage of the accelerator is given in percentage of weight of total solid with respect to the weight of cement.

The indicated amounts of water include the water, which is contained in the added plasticizer and/or accelerator composition.

Glenium® ACE30 was added as superplasticizer at the end of the mixing process, the dosage is expressed as weight percentage of solid content with respect to the cement weight.

The accelerator compositions to be tested are added to the mixing water before the mixing with the cement. The quantity of accelerators added is given in percentage of suspension weight (including water) with respect to the cement weight (please compare with the dosages in table 4).

After preparation of the concrete mixes, test specimens [cubes having an edge length of 15 cm] are produced according to DIN-EN 12390-2, compacted with a vibration table and are stored at the desired curing temperature (5° C., 20° C. or 50° C.), and the compressive strength is determined after various times.

Details of the concrete experiments and results are summarized in Table 4.

The results of the concrete tests in Table 4 are discussed in the following chapter. It was found that in comparison to the commercially available product X-SEED® 100 a considerably lower dosage was needed for both cement types in order to achieve about the same acceleration effects, especially the dosage efficiency (compressive strength) after 6 hours and 9 hours is influenced significantly in a positive way.

The invention claimed is:

1. A process for the preparation of a hardening accelerator composition by reaction of a water-soluble calcium compound with a water-soluble silicate compound, the reaction of the water-soluble calcium compound with the water-soluble silicate compound being carried out in the presence of an aqueous solution which contains a water-soluble comb polymer suitable as a plasticizer for hydraulic binders, wherein the water-soluble comb polymer suitable as a plasticizer for hydraulic binders is present as a copolymer which is produced by free radical polymerization in the presence of a phosphorylated monomer and a (meth)acrylic acid ester based polyether macromonomer, so that a structural unit is produced in the comb polymer by incorporation of the phosphorylated acid monomer in the form of polymerized units, which structural unit is in accordance with general formula (I)

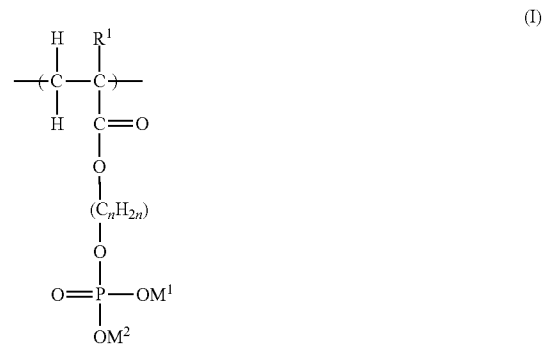

where
R¹ are identical or different and are independently of one another represented by H and/or a non-branched chain or branched $C_1$-$C_4$ alkyl group,

TABLE 4

Concrete test results

| Test No. | Cement | Glenium ACE 30 Dosage | Accelerator Type | Dosage | Slump Flow [cm] | | | Compressive Strength [MPa] | | |
|---|---|---|---|---|---|---|---|---|---|---|
| | | | | | 0 min | 10 min | 30 min | 6 h | 9 h | 24 h |
| Mix 1 (ref.) | K 42,5R | 0.22% | — | — | 68 | 67 | 56.5 | <2 | <2 | 34 |
| Mix 2 (C) | K 42,5R | 0.20% | X-SEED ®100 | 4% | 67 | 68 | 60.5 | 2.5 | 13 | 39.5 |
| Mix 3 | K 42,5R | 0.23% | Acc. 13 | 2.50% | 69.5 | 67 | 65 | 2.5 | 14.5 | 40 |
| Mix 4 (ref.) | B 42,5R | 0.15% | — | — | 60 | 52.5 | 40 | <2 | 3.66 | 33 |
| Mix 5 (C) | B 42,5R | 0.14% | X-SEED ®100 | 4% | 60.5 | 58 | 44 | 5 | 18 | 37.5 |
| Mix 6 (C) | B 42,5R | 0.14% | X-SEED ®100 | 3% | 60.5 | 59 | 46 | 4 | 16 | 36.5 |
| Mix 7 | B 42,5R | 0.14% | Acc. 13 | 2.50% | 59 | 56 | 47 | 5 | 17 | 37.5 |

K 42,5R is an abbreviation for the cement Karlstadt 42,5R and B 42,5R is an abbreviation for the cement Bernburg 42,5R.

where n =2, 3 or 4,
M¹ and M² are identical or different and independently from one another H and/or a cation equivalent,
and that a structural unit is produced in the comb polymer by incorporation of the (meth)acrylic acid ester based polyether macromonomer in the form of polymerized units, which structural unit is in accordance with general formula (II),

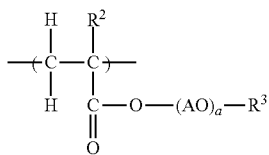

where
R² is identical or different and independently of one another, is represented by H and/or a non-branched chain or branched $C_1$-$C_4$ alkyl group,
A are identical or different and are represented by $C_xH_{2x}$ where x=2, 3, 4 and/or 5, with the proviso that at least 85 mol % of A are $C_2H_4$,
a are identical or different and are represented by an integer from 65 to 160,
R³ are identical or different and independently of one another are represented by H and/or a non-branched chain or a branched $C_1$ -$C_4$ alkyl group, and wherein the molar ratio of structural from acid monomers according to formula (I) to structural units from polyether macr-monomers according to formula (II) in the comb polymer is from 3/1 to 7/1.

2. The process according to claim 1, characterized in that in formula (I) R¹ is methyl.

3. The process according to claim 1, characterized in that in formula (II) R² is methyl, x=2 and/or =3.

4. The process according to claim 1, characterized in that in formula (II) R³ is methyl and x=2.

5. The process according to claim 1, characterized in that the molar ratio of structural units from acid monomers according to formula (I) to structural units from polyether macromonomers according to formula (II) in the comb polymer is from 3.5/1 to 5.5/1.

6. The process according to claim 1, characterized in that structural units are produced in the comb polymer by incorporation of carboxylic acid monomers.

7. The process according to claim 1, characterized in that the aqueous solution containing a water-soluble comb polymer suitable as a plasticizer for hydraulic binders furthermore contains the water-soluble calcium compound and the water-soluble silicate compound as components dissolved in it.

8. The process according to claim 1, characterized in that a solution of a water-soluble calcium compound and a solution of a water-soluble silicate compound are added to the aqueous solution containing a water-soluble comb polymer suitable as a plasticizer for hydraulic binders.

9. The process according to claim 1, characterized in that the solution of a water soluble calcium compound and/or the solution of a water-soluble silicate compound contain a water-soluble comb polymer suitable as a plasticizer for hydraulic binders.

10. The process according to claim 1, characterized in that the aqueous solution containing a water-soluble comb polymer suitable as a plasticizer for hydraulic binders contains a water-soluble calcium compound or a water-soluble silicate compound.

11. The process according to claim 1, characterized in that the components are used in the following ratios:

i) 0.01 to 75% by weight of water-soluble calcium compound,
ii) 0.01 to 75% by weight of water-soluble silicate compound,
iii) 0.001 to 60% by weight of water-soluble comb polymer suitable as a plasticizer for hydraulic binders,
iv) 50 to 99% by weight of water.

12. The process according to claim 1, characterized in that the water-soluble calcium compound is present as calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium oxide, calcium hypochloride, calcium iodate, calcium iodide, calcium lactate, calcium nitrite, calcium oxalate, calcium phosphate, calcium propionate, calcium silicate, calcium stearate, calcium sulphate, calcium sulphate hemihydrate, calcium sulphate dihydrate, calcium sulphide, calcium tartrate, calcium aluminate, tricalcium silicate and/or dicalcium silicate.

13. The process according to claim 1, characterized in that the water-soluble silicate compound is present as sodium silicate, potassium silicate, waterglass, aluminium silicate, tricalcium silicate, dicalcium silicate, calcium silicate, silicic acid, sodium metasilicate and/or potassium metasilicate.

14. The process according to claim 1, characterized in that the hardening accelerator composition contains no Portland cement or that less than 20 weight % of Portland cement with respect to the total weight of the hardening accelerator composition is contained.

15. The process according to claim 1, followed by a process step in which the hardening accelerator composition is dried.

16. A hardening accelerator composition obtained by the process according to claim 1.

17. A process comprising utilizing the hardening accelerator composition according to claim 16 in building material mixtures containing Portland cement, Portland clinker, slag, ground granulated blast furnace slag, fly ash, silica dust, metakaolin, natural pozzolans, calcined oil shale, calcium sulpho aluminate cement and/or calcium aluminate cement.

18. Building material mixtures containing the hardening accelerator composition according to claim 16 and Portland cement, Portland clinker, slag, ground granulated blast furnace slag, fly ash, silica dust, metakaolin, natural pozzolans, calcined oil shale, calcium sulpho aluminate cement and/or calcium aluminate cement.

19. The process according to claim 1, wherein R¹ is methyl and/or n=2 in general formula (I).

20. The process according to claim 1, wherein R² is methyl and/or A is represented by $C_xH_{2x}$ where x=2 in general formula (II).

21. The process according to claim 3, wherein R³ is H.

22. The process according to claim 6, characterized in that structural units are produced in the comb polymer by incorporation of (meth)acrylic acid monomers.

23. The process according to claim 11, characterized in that the components are used in the following ratios:
i) 0.01 to 51% by weight of water-soluble calcium compound,
ii) 0.01 to 55% by weight of water-soluble silicate compound,
iii) 0.1 to 30% by weight of water-soluble comb polymer suitable as a plasticizer for hydraulic binders,
iv) 70 to 99% by weight of water.

24. The process according to claim 15, wherein the hardening accelerator composition is dried by a spray drying process.

25. The process according to claim 17, wherein the building material mixtures contain Portland cement as a hydraulic binder.

* * * * *